United States Patent Office 3,292,411
Patented Dec. 20, 1966

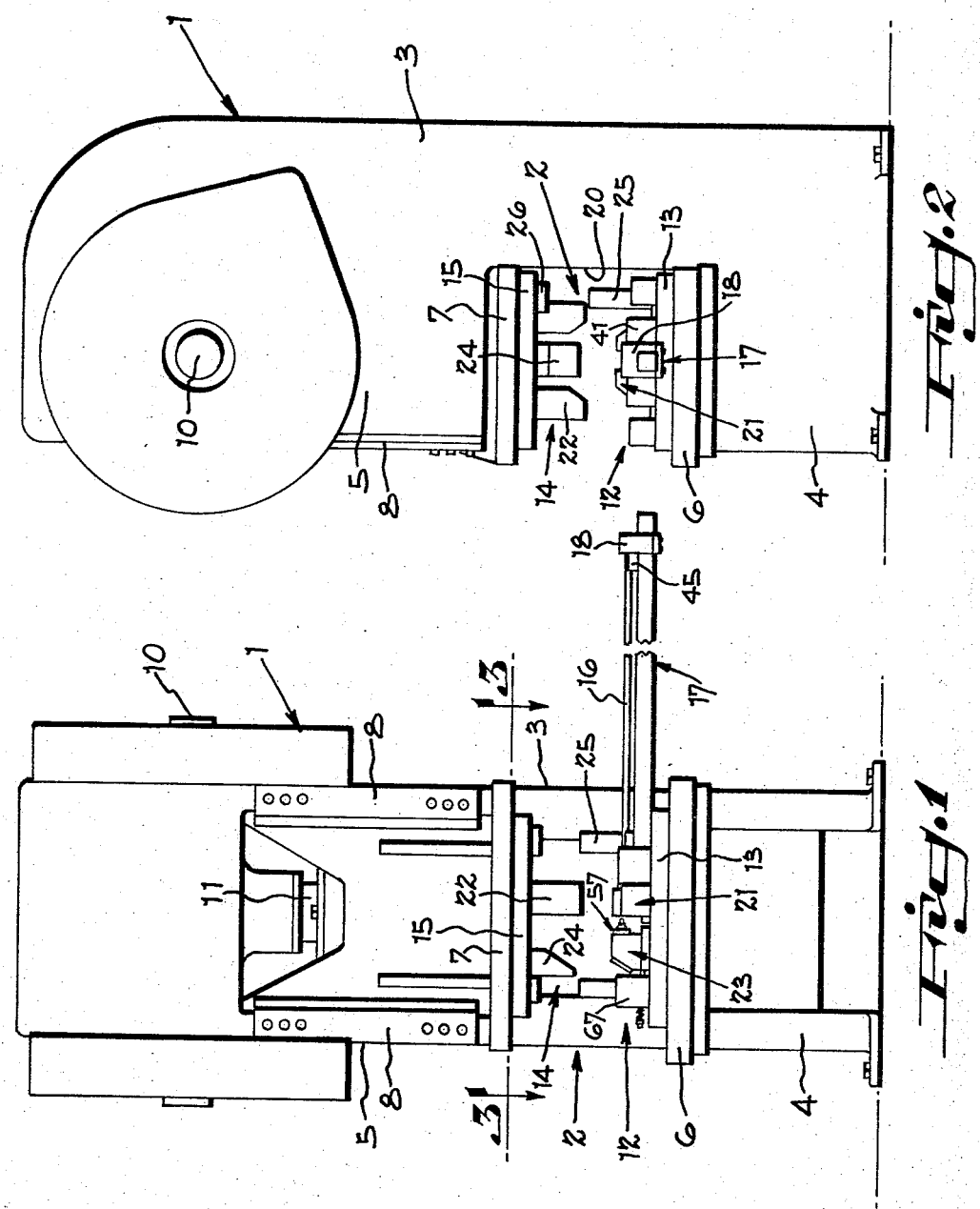

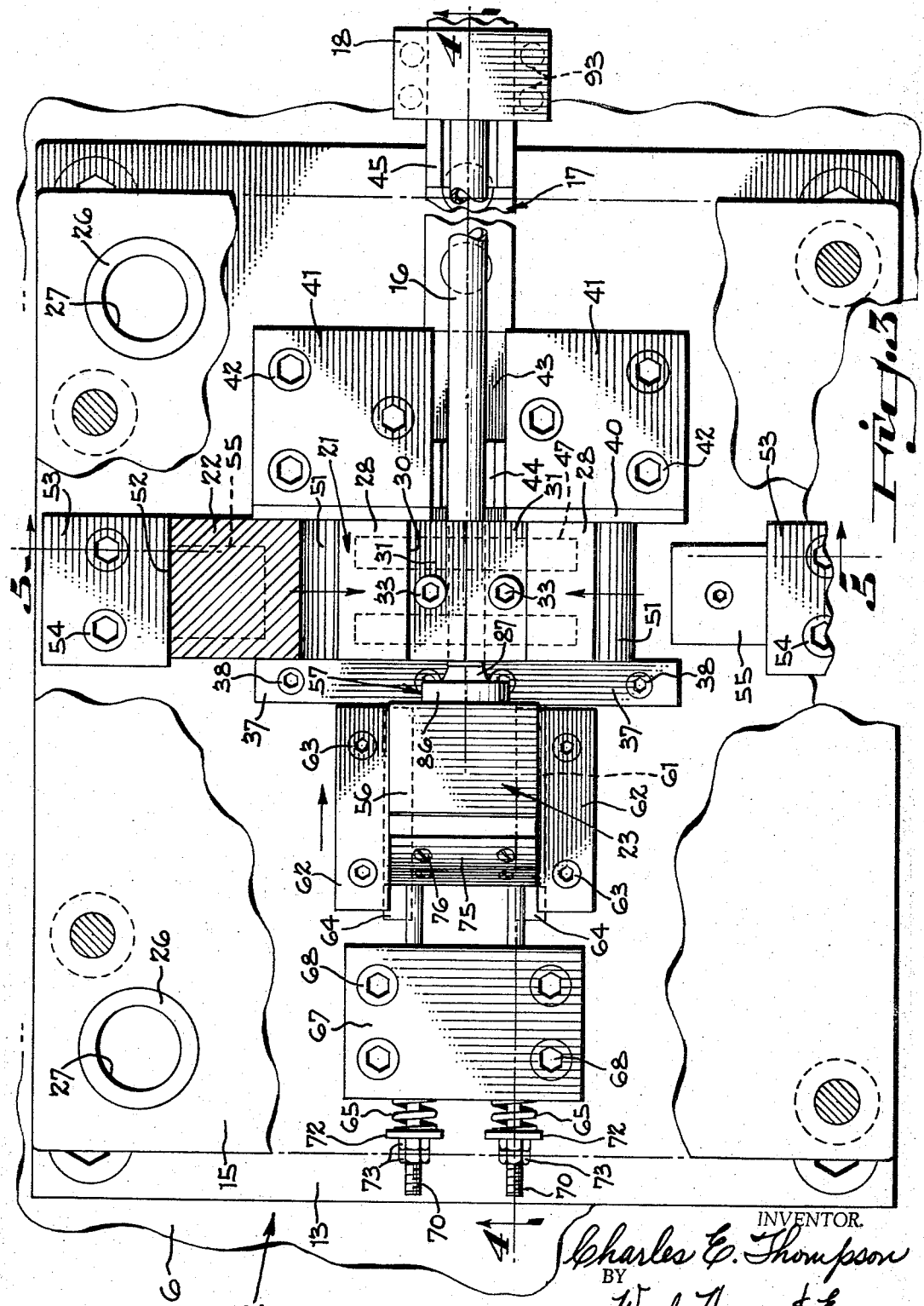

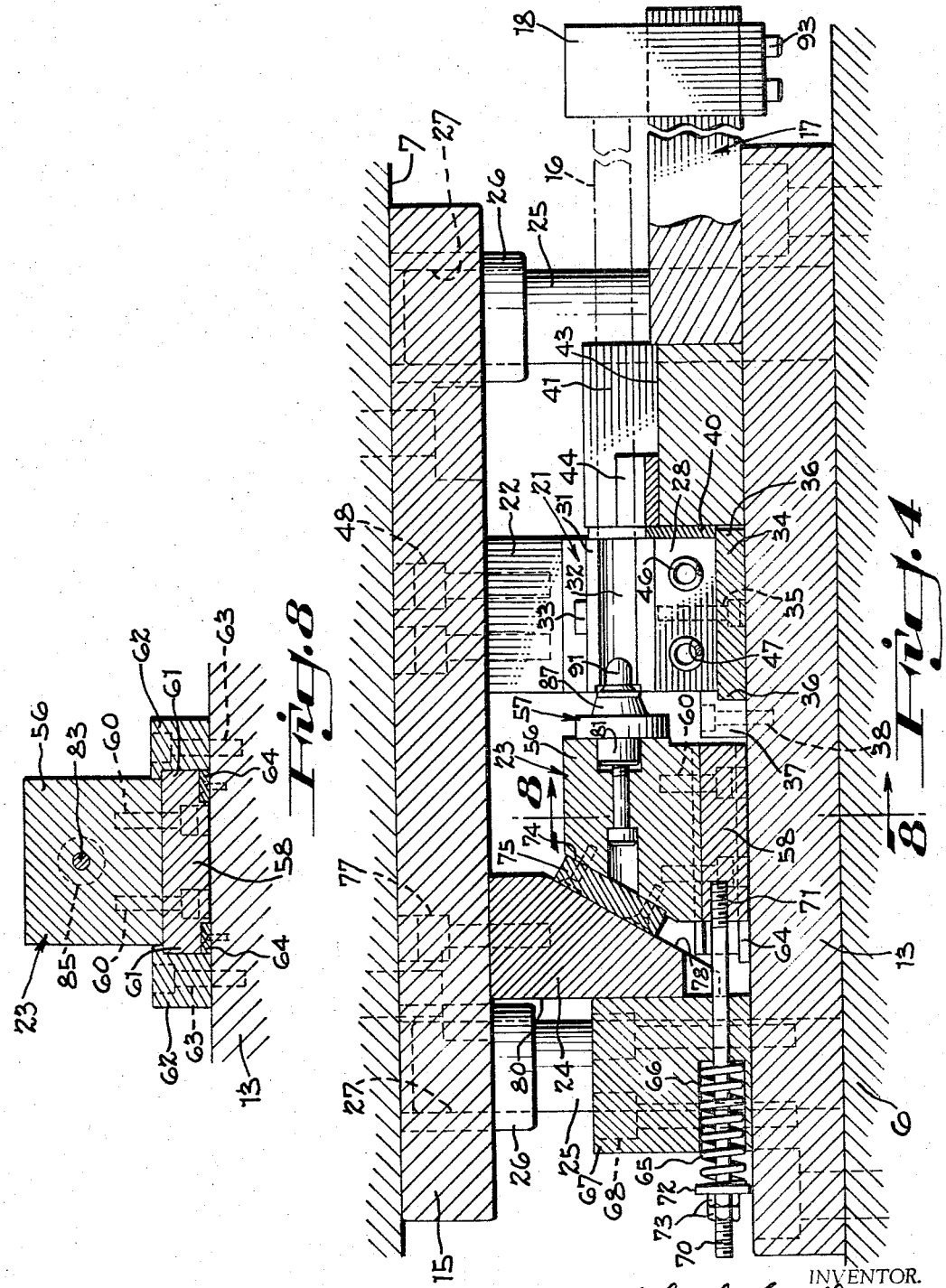

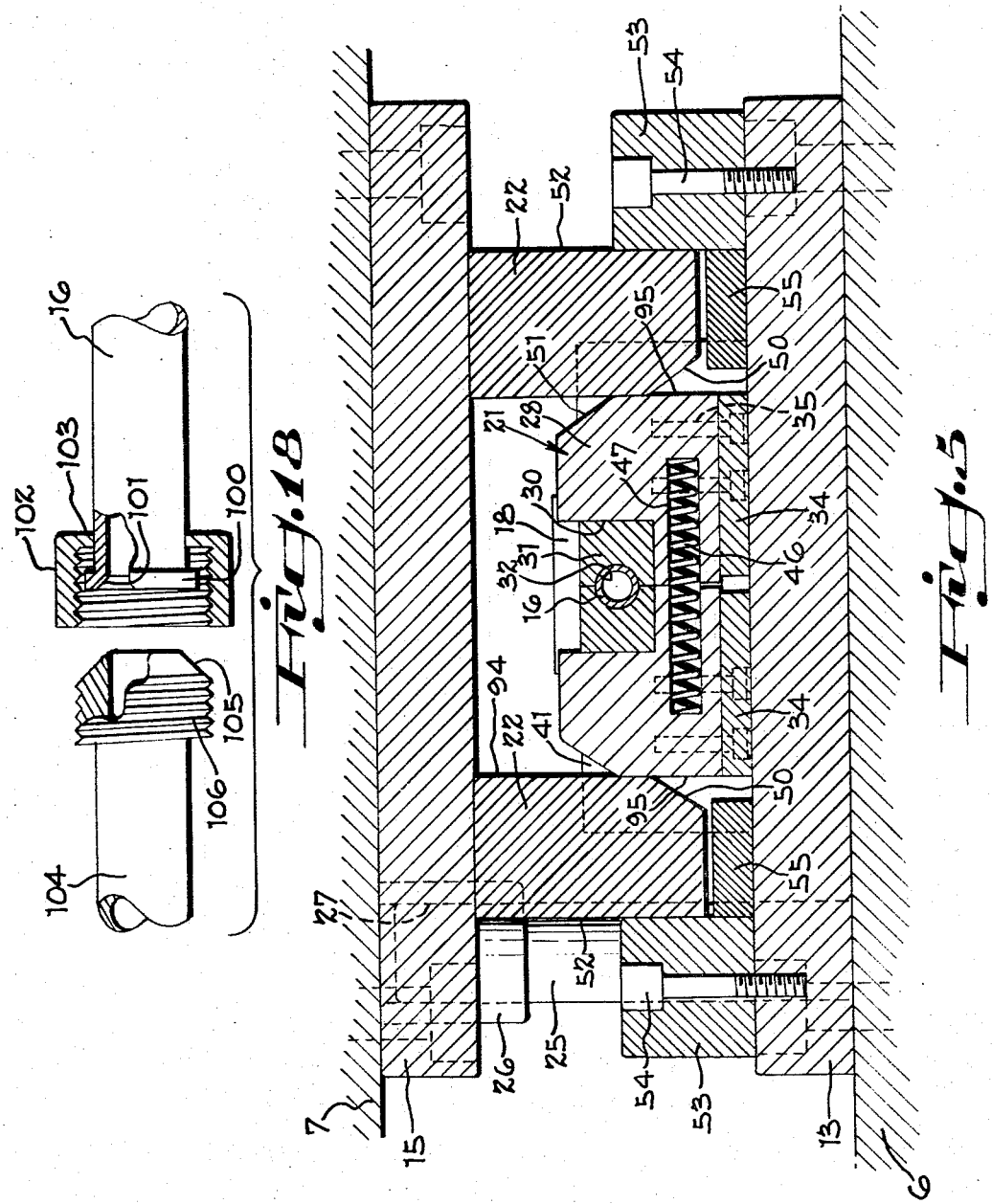

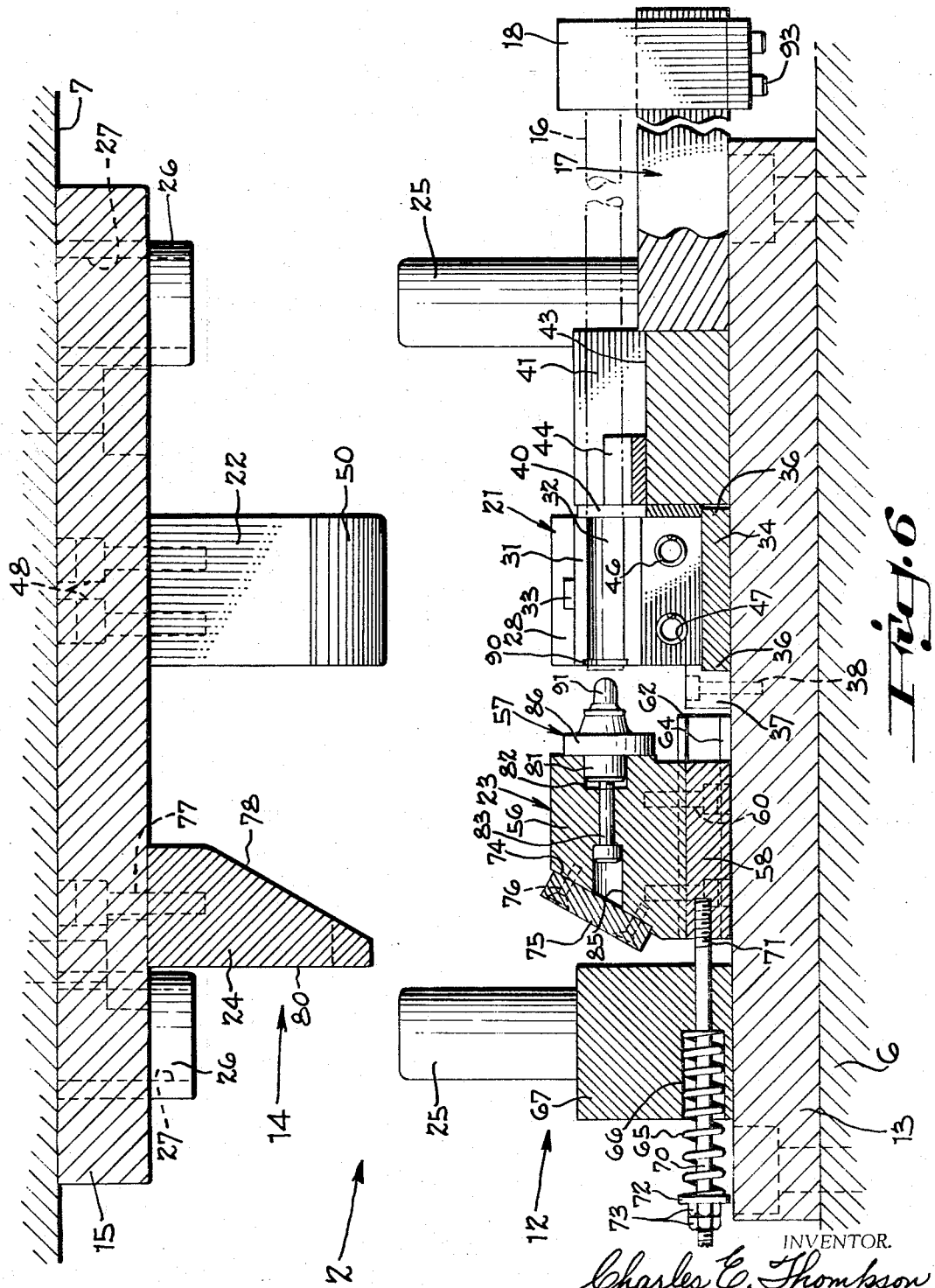

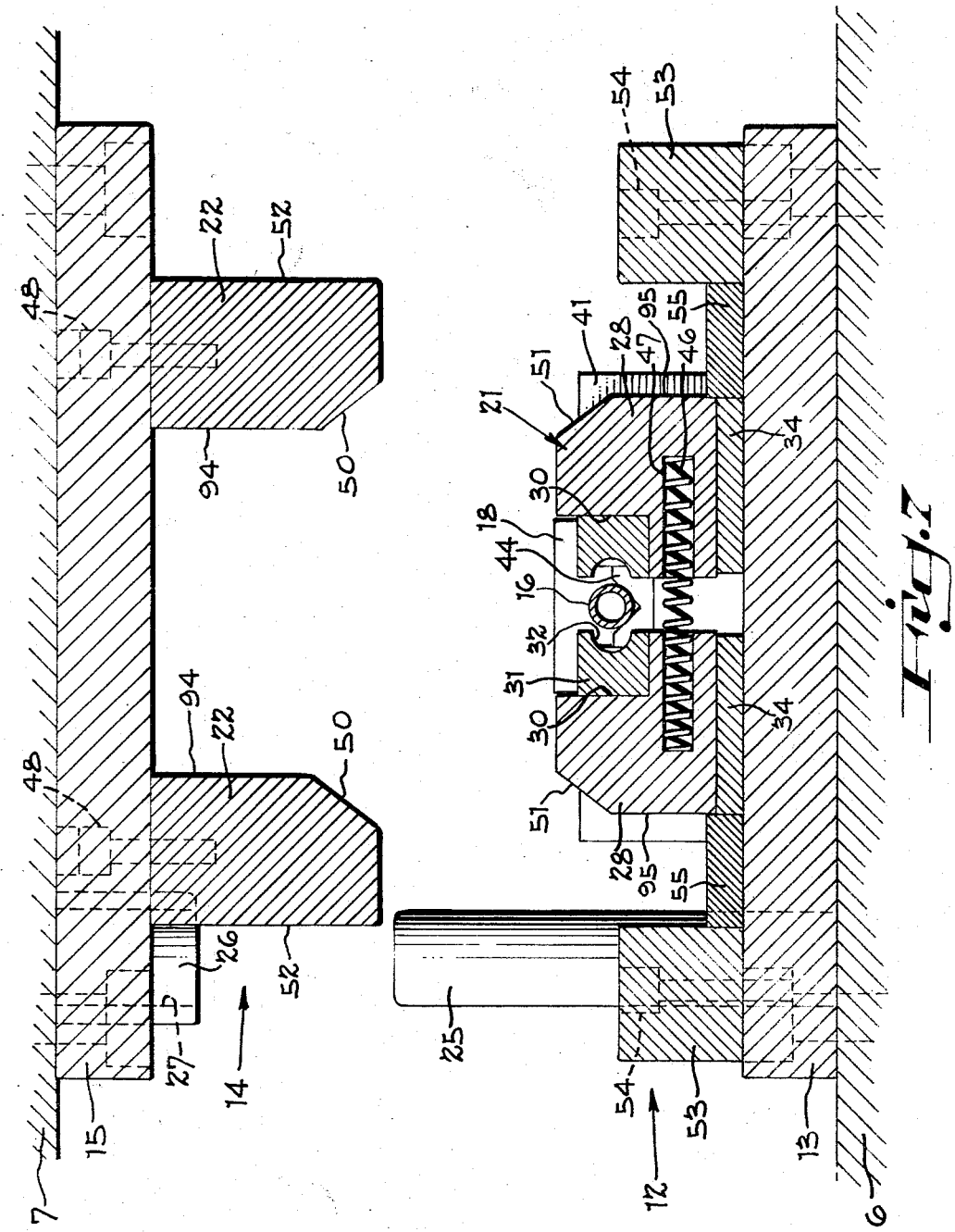

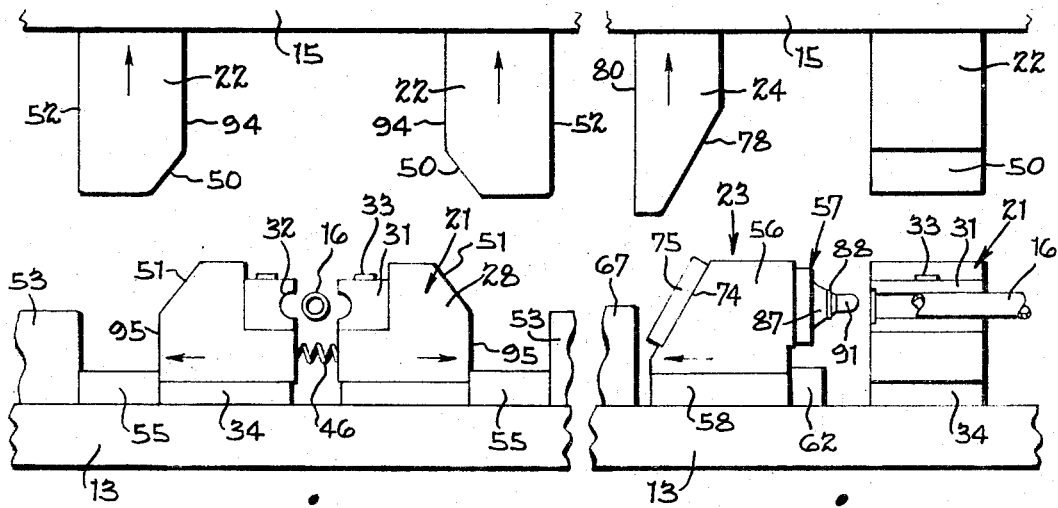
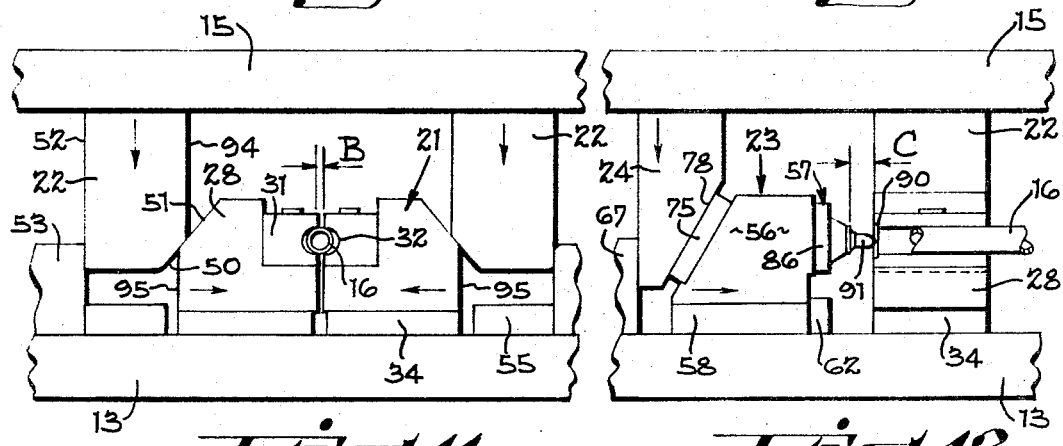
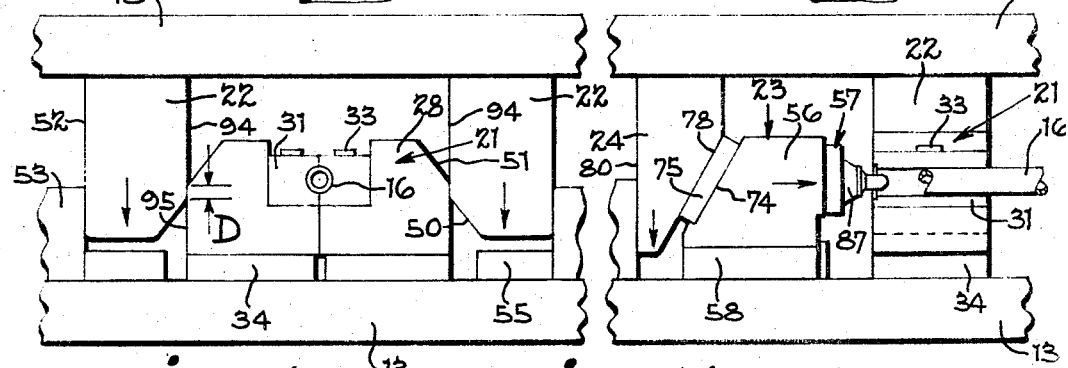

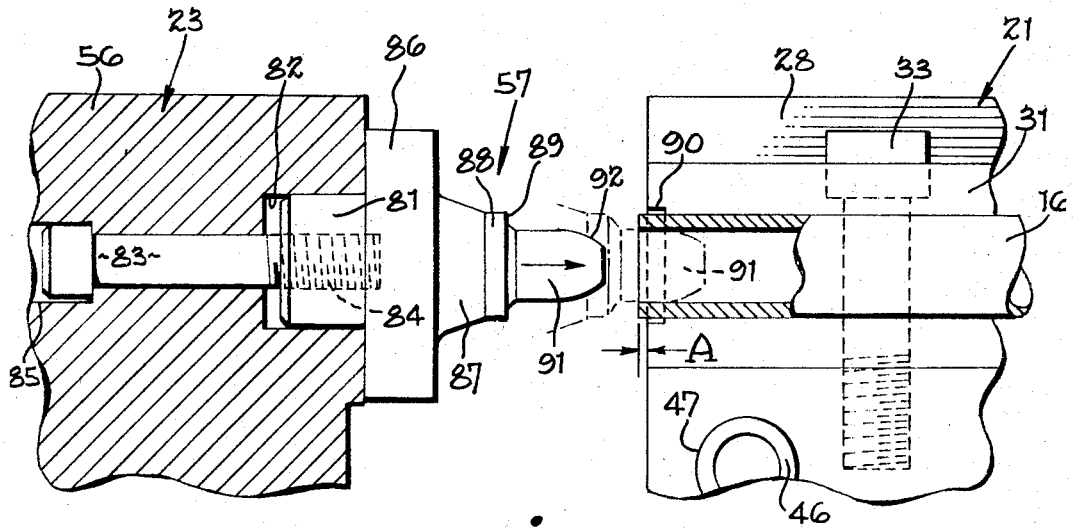
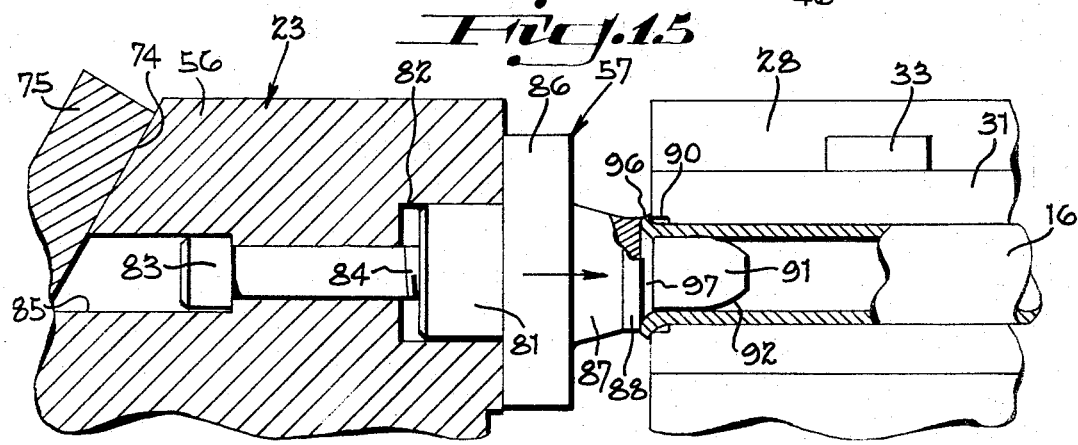
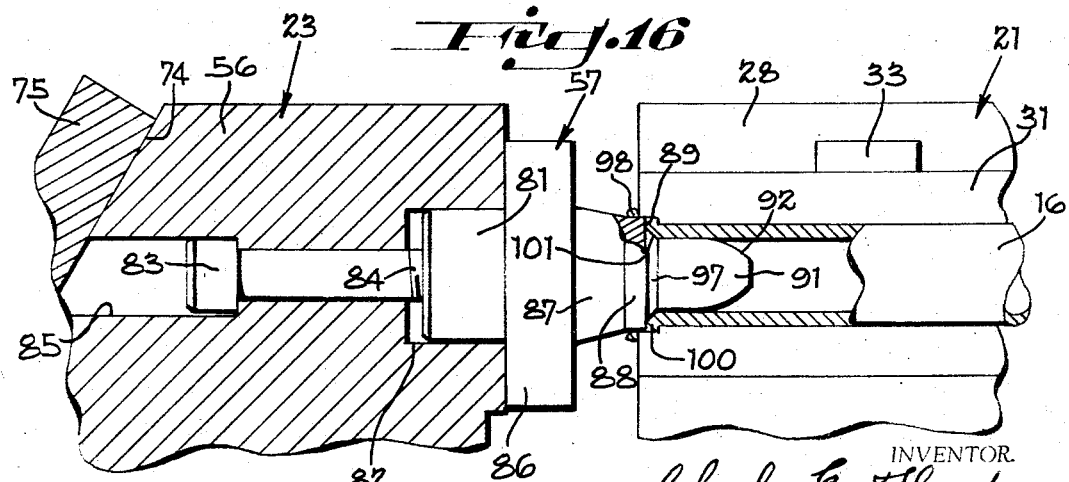

3,292,411
FORMING MECHANISM FOR COLD HEADING
PIPE SECTIONS
Charles E. Thompson, Lebanon, Ohio, assignor to Gas
Appliance Supply Corporation, Indianapolis, Ind., a
corporation of Indiana
Filed Aug. 24, 1964, Ser. No. 391,649
16 Claims. (Cl. 72—314)

This invention relates to the art of cold metal swaging and is directed particularly to a heading mechanism which is arranged to swage an annular external head or flange on the end of a pipe section. The mechanism also forms an internal tapered seat in the headed end portion of the pipe section.

A headed pipe section of this type is utilized, for example, as part of a pipe union for connecting the headed pipe section to a companion section, with a coupling nut joining the two pipe sections with one another. The coupling nut engages the flange of the headed pipe section and is screwed upon the threaded end portion of the companion pipe section, the arrangement being such that the nut, upon being tightened, draws the coacting seats of the two pipe sections forcibly into sealing engagement.

One of the primary objectives of the present invention has been to provide a pipe heading mechanism which flares the external annular head or flange upon the end portion of the pipe section, and concurrently, forms an internal tapered seat within the headed end portion, the complete forming operation being carried out in a single cycle of operation.

According to this aspect of the invention, the pipe heading operation is carried out by a die set comprising, in general, a pipe clamping fixture which engages the periphery of the end portion of the pipe to be headed, and a flaring punch which cooperates with the clamping fixture.

The term "pipe clamping fixture" as used in the specification, refers to a pair of clamping dies arranged to forcibly embrace the end portion of the pipe section so as to act as a forming die during the heading operation. The term "flaring punch" refers to a composite punch unit which executes the pipe heading operation during a single stroke in relation to the pipe clamping fixture. Briefly, the flaring punch comprises an elongated, tapered stud which forcibly enters the end portion of the pipe section to expand an end portion of the pipe (which is confined in the clamping fixture) to a concentric formation in the event the pipe section is out of round.

The base of the flaring punch includes a swaging head which coacts with an annular die recess formed in the clamping fixture and arranged to form the headed end of the pipe after the stud has carried out the pipe expanding action. The tapered stud includes a flaring taper at its juncture with the swaging head and is arranged to form an internal seat in the pipe section concurrently with the formation of the head. The flaring punch and coacting clamping fixture reduce the end portion of the pipe, including the annular head and internal seat, to their finished dimension, such that the pipe section is ready to be used upon being discharged from the heading mechanism.

A further objective of the invention has been to provide a pipe heading mechanism which is adapted to be mounted in a power press having a stationary platen, and having a ram which is shifted vertically relative to the platen, the heading mechanism being mounted upon the platen and adapted to receive the pipe sections in a horizontal position extending laterally from the ram of the press, whereby the length of pipe sections to be headed are not limited by the stroke of the ram, thus making it possible to head pipes of substantial length without reference to the length of the ram stroke.

According to this aspect of the invention, the pipe clamping fixture, which is mounted upon the stationary platen of the press, includes opposed slide blocks including coacting clamping dies having circular recesses adapted to clampingly embrace the opposite sides of the portion of the pipe section which is to be headed. The flaring punch is mounted on a generally similar slide block and is adapted to be shifted axially with respect to the end portion of the pipe section which is confined in the clamping dies.

At the beginning of a cycle of operation, the slide blocks of the clamping dies are separated from one another and the flaring punch is shifted to a retracted position, permitting the pipe section to be placed in the die set with its outer end engaged against an adjustable stop. The adjustable stop is located to confine the pipe section axially with its end portion projecting slightly beyond the face of the clamping dies to provide a mass of metal sufficient to form the head or flange during the swaging operation.

The vertically movable ram of the press includes a mounting plate having a pair of cam blocks including inclined surfaces adapted to close the slide blocks of the clamping dies during the downward ram motion. The mounting plate also includes a cam block having an inclined surface adapted to engage the slide block of the flaring punch.

At the beginning of a cycle, with the pipe section loosely positioned between the clamping dies, the ram descends, causing the pair of cam blocks of the clamping dies to provide a wedging action, forcing the clamping dies into positive pressure engagement against the opposite sides of the pipe section. Thereafter, the cam block of the flaring punch provides a wedging engagement with the punch slide block, thus wedging the flaring punch under pressure into the open end of the pipe section which is confined between the clamping dies. As noted above, the flaring punch is arranged first to expand the end portion of the pipe section to finish it to its final concentric dimension within the clamping dies, and thereafter, to swage the clamped portion of the pipe which projects beyond the clamping dies, thereby to form the head and the internal tapered seat.

Briefly therefore, the present heading mechanism overcomes any reasonable limitation as to the pipe section length in relation to the stroke of the press by converting the vertical ram motion into vertical wedging motion acting upon the clamping fixture and flaring die. Moreover, the mechanism takes advantage of the wedging action of the heading mechanism to increase substantially the thrust which is generated by the press ram.

Still another objective of the invention has been to provide a forming mechanism which is capable of acting upon pipe sections having different diameters. According to this aspect of the invention, the heading die set is provided with interchangeable clamping dies and interchangeable flaring punches which are demountably secured in the slide blocks of the clamping fixture and flaring punch. The clamping dies include circular recesses machined to interfit the external diameter of the several pipe sections; mating punches are provided having studs matching the inside diameter of the corresponding pipe size.

In order to obtain uniform results, the coacting clamping dies and flaring punch are arranged to trim off any excess metal during the head forming operation. For this purpose, the face of the clamping dies, from which the end portion of the pipe section protrudes, includes an annular die recess corresponding to the size of the head to be formed. The swaging head of the flaring die interfits the recess. During the final motion of the flaring punch, the edges of the recess and swaging head coact with one another to shear off any excess metal which may project beyond the face of the clamping dies; thereafter, the trimmed end portion is forced under high pressure by the swaging head into the recess, thereby to swage the head to its final dimension.

The various objects and advantages of the invention will be more fully apparent to those skilled in the art from the following detailed description taken in conjunction with the drawings.

In the drawings:

FIGURE 1 is a front elevation of a power press showing generally the arrangement of the pipe heading mechanism in relation to the press. In this view, the ram of the press is shown in its elevated position at the start of the heading operation.

FIGURE 2 is a side elevation of the press and pipe heading mechanism as projected from FIGURE 1.

FIGURE 3 is an enlarged top plan view, partially broken away, taken along line 3—3 of FIGURE 1, further illustrating the pipe heading mechanism. In this view, the parts are shown in the closed position which they assume when the ram of the press descends from the elevated position of FIGURE 1 to perform the pipe heading operation.

FIGURE 4 is a fragmentary sectional view taken along line 4—4 of FIGURE 3, further detailing the pipe heading mechanism with the parts in the closed or heading position as shown in FIGURE 3. This view illustrates particularly the relationship of the flaring punch and associated parts at the limit of the heading stroke.

FIGURE 5 is a fragmentary sectional view taken along line 5—5 of FIGURE 3, showing the clamping fixture in the closed position prior to the forming stroke of the flaring punch shown in FIGURE 4.

FIGURE 6 is a fragmentary sectional view similar to FIGURE 4, showing the relationship of the parts when the ram of the press is in its elevated position corresponding to FIGURE 1.

FIGURE 7 is a fragmentary view similar to FIGURE 5 showing the pipe clamping fixture in the open, pipe-receiving position corresponding to FIGURES 1 and 6.

FIGURE 8 is a sectional view taken along line 8—8 of FIGURE 4, detailing the slide block which mounts the flaring punch for reciprocation relative to the end of the pipe.

FIGURE 9 is a diagrammatic view, generally similar to FIGURE 7, showing the retracting motion of the ram and clamping dies to permit removal of the headed pipe as the ram is elevated after the forming stroke.

FIGURE 10 is a diagrammatic view as projected from FIGURE 9, illustrating the retracting motion of the flaring punch as the ram retracts after completion of the forming stroke.

FIGURES 11 and 12 are diagrammatic views similar to FIGURES 9 and 10, illustrating the sequential advancement of the clamping dies and flaring punch as the ram of the press descends during the heading operation.

FIGURES 13 and 14 are diagrammatic views similar to FIGURES 11 and 12 showing the relationship of the parts during continued motion of the ram, with the clamping dies shifted into clamping engagement with the pipe section and with the flaring punch advancing toward its final pipe heading position.

FIGURE 15 is an enlarged fragmentary view, taken from FIGURE 6, showing the motion of the flaring punch toward the end of the pipe during the heading stroke of the ram. This view corresponds generally to the position of the parts in FIGURE 12.

FIGURE 16 is a view similar to FIGURE 15, showing the position of the flaring punch as it engages and swages or upsets the end of the pipe during the heading operation.

FIGURE 17 is a view similar to FIGURE 16, showing the heading punch at its forward limit of travel, with the head formed on the pipe section and with the excess metal sheared away.

FIGURE 18 is a fragmentary view showing the headed pipe section in relation to a companion pipe section to which it is to be coupled.

*General arrangement*

As best shown in FIGURES 1 and 2, there is illustrated a power press, indicated generally at 1, with the pipe heading mechanism, indicated generally at 2, mounted in operating position in the press. The press 1 comprises a rigid frame 3 having a base 4 resting upon the floor, and a head portion 5 overhanging the base. The base 4 includes a stationary platen 6 and the head portion 5 includes a ram 7 which is mounted for vertical reciprocation in the slideways 8—8 relative to the stationary platen. The head portion of the press includes a power shaft 10 having fly wheels (not shown), one of the fly wheels being connected to a motor or other power source (not shown) for rotating the fly wheels and power shaft 10.

The press is of a conventional design and therefore has not been disclosed in detail. It will be understood that the power shaft 10 includes a suitable eccentric or cam arrangement connected by a plunger 11 to the ram 7 for reciprocating the ram. A suitable control device, such as a treadle, for foot operation (not shown), is mounted in the base 4 and is interconnected with a clutch for coupling the platen reciprocating mechanism to the power shaft. This arrangement is also conventional and provides a single cycle of operation each time the treadle or other control device is actuated.

Thus, in the position of FIGURES 1 and 2, the ram 7 is shown in its elevated, pipe-loading position, which is assumed at the end of each cycle of operation. When the treadle is depressed, the ram descends from its retracted to its advanced pipe-heading position (FIGURE 4) then immediately retracts to its elevated position to permit the headed pipe to be removed from the press. It will be understood that the heading mechanism 2 may be utilized in various types of conventional presses other than the one disclosed, for example, hydraulically operated presses having the required ram pressure and stroke length.

In general, the pipe heading mechanism 2 comprises a pipe heading die set 12 (FIGURES 1 and 2), which is mounted by means of a bolster or mounting plate 13 upon the platen 6 of the press. The pipe heading die set 12 is actuated by a cam block assembly, indicated generally at 14, which forms a part of an upper mounting plate 15 secured to the ram 7 of the press. Upon initiation of the pipe forming cycle, the ram 7 and its cam block assembly 14 descends from the position of FIGURES 1, 6 and 7 to the position of FIGURE 4 to actuate the die set 12, as explained later in detail.

As best shown in FIGURE 1, the pipe section 16 to be headed is placed in a support fixture, indicated generally at 17 which projects laterally from the mounting plate 13 of die set 12. The fixture includes an adjustable abutment block 18 which serves as a gauge with reference to the outer end of the pipe section 16 to locate its inner end properly with reference to the pipe heading die set, as explained later in detail.

It will be noted in FIGURE 2 that the throat portion 20 of the conventional press, which is delineated by the base 4 and overhanging head portion 5, could not accommodate pipe sections having a substantial length. Otherwise expressed, it would not be practical to construct a special press having a throat of sufficient vertical size to accommodate the length of the pipe sections, using direct acting dies. The present pipe heading mechanism 2 thus converts the relatively short stroke of ram 7 into vertical motion (and increases the die pressure) to permit the pipe sections 16 to be acted upon in a horizontal position. By virtue of this arrangement, any length of pipe section 16, within the limits of the support fixture 17 may be headed simply by making the necessary adjustment of the abutment block 18 of fixture 17.

As shown generally in FIGURES 1 and 2, the pipe heading die set 12 comprises a pipe clamping fixture, indicated generally at 21, associated with the pipe support fixture 17 and adapted to clamp the end portion of the pipe section rigidly in position during the heading operation. As described later in detail, the pipe clamping fixture 21 is shiftable in a horizontal plane with respect to the mounting plate 13 from the open pipe-receiving position (FIGURE 7) to the clamping position (FIGURE 5). Opposed cam blocks 22—22 attached to the upper mounting plate 15 of press ram 7 actuate the pipe clamping fixture 21.

The pipe heading operation is carried out by a pipe heading die assembly, indicated generally at 23 which is also shiftable horizontally with respect to the mounting plate 13 from the retracted to an advanced position (FIGURES 4 and 6). The heading die assembly 23 is actuated by a cam block 24, which is also mounted upon plate 13 of press ram 7 for movement in unison with the cam blocks 22 which actuate the clamping fixture 21. As explained later in detail, the arrangement is such that the clamping fixture 21 is shifted to its closed pipe clamping position before the pipe heading die assembly 23 is shifted forwardly to its pipe heading position.

In the present example, the press is provided with a pair of vertical guide or pilot pins 25—25 rising from the lower mounting plate 13 (FIGURES 1 and 2). The upper mounting plate 15 includes a pair of guide bushings 26—26. The bushings 26 are fitted into the upper mounting plate 15 in axial alignment with its guide pin 25. Each bushing 26 (FIGURE 3) includes a bore 27 closely interfitting its guide pin 25. During the downward stroke of the ram (FIGURE 4), the upper end portions of the guide pins 25 pass into the bores 27 of bushing 26, thus guiding the upper mounting plate 15 and its cam blocks 22 and 24 accurately in alignment with the components of the lower mounting plate 13.

Pipe clamping fixture

As best shown in FIGURES 3, 5 and 7, the pipe clamping fixture 21 comprises opposed slide blocks 28—28 supported upon the lower mounting plate 13 for sliding motion. The inner face of each block 28 is provided with a right angular inset 30 for receiving a demountable clamping jaw or die 31. The inner face of each clamping die 31 includes a semi-circular recess 32 machined to interfit the periphery of the pipe section 16. It will be noted in FIGURE 7 that the clamping dies 31, in the open position, provide sufficient clearance to allow the pipe section to be placed from above into working position between the dies. As shown in FIGURE 5, the opposed recesses 32—32 snugly embrace the entire periphery of the pipe section 16 when the jaws are shifted to their closed position.

As explained earlier, the clamping dies 31—31 are furnished in interchangeable pairs, the faces of which are provided with recesses 32 having a radius to clampingly engage the various pipe diameters for which the machine is intended. In order to permit interchange, the respective clamping dies 31 are secured in place by means of screws 33 (FIGURE 3) passing through the dies 31 into threaded engagement with the slide blocks 28 in which they are seated.

It will be understood, that the clamping dies 31—31 in closed position (FIGURE 5) act as forming dies which coact with respect to the end portion of the pipe section 16 which is clamped therein. In other words, the dies 31 maintain the concentricity of the end portion of the pipe section to provide an accurate external dimension when the flaring punch is forced into the end portion of the pipe section 16, as explained later.

The slide blocks 28—28 of the clamping fixture 21 each include a slide plate 34 secured by screws 35 to the under surface of the block 28 and slidably engaged upon the surface of the mounting plate 13. As viewed in FIGURE 4, each slide plate 34 has outer edges which project as at 36 beyond the side edges of the slide block 28. A hold-down rail 37 is secured by screws 38 to the mounting plate 13 and overhangs the left hand edge 36 of slide plate 34. The opposite overhanging edge 36 of slide plate 34 is engaged by a hold-down bar 40. Bar 40 is attached to a pipe locating block 41 secured by screws 42 to the mounting plate 13.

The block 41 forms a part of the pipe-supporting fixture 17 and includes, in its upper surface, an open V-shaped groove 43 (FIGURES 3 and 4) to accommodate the pipe section 16. The V-shaped groove 43 includes a V-shaped centering block 44 which engages the end portion of the pipe.

A similar V-shaped centering block 45 (FIGURE 3) is mounted at the outer end of the support fixture 17 to support the outer end of the pipe section 16. Upon being placed in the fixture 17, with its opposite ends supported by the centering blocks 44 and 45, the pipe section 16 is held in axial alignment with the semi-circular recesses 32 of the opposed dies 31. Upon closing, the dies 31 correct any minor misalignment of the pipe section 16 with reference to the axis of the pipe flaring punch, as explained later.

As best shown in FIGURE 7, the clamping slide blocks 28—28 are normally urged outwardly to the open, pipe-receiving position by a pair of compression springs 46—46. The outer end portions of the springs 46 are confined in bores 47 which extend inwardly from the opposed faces of the slide blocks 28. As shown in FIGURE 3, the compression springs 46 are disposed in parallelism with one another, straddling the screws 33 which detachably secure the clamping dies 31 in position with respect to the slide blocks 28.

As noted earlier, the opposed slide blocks 28—28 are forced toward one another into clamping engagement with the end portion of the pipe section 16 by the cam blocks 22—22. The blocks 22 are secured to the upper mounting plate 15 by screws 48—48 (FIGURES 5 and 7). Each cam block 22 includes an inclined cam surface 50 while each slide block 28 is provided with a cam surface 51 which corresponds to the angle of the inclined cam surface 50. Accordingly, as the ram 7 and the cam blocks 22 descend from the position of FIGURE 7 to the position of FIGURE 5, during the heading cycle, the opposed cam surfaces 50 engage the corresponding cam surfaces 51 of the clamping slide blocks 28 to force the cam blocks and their clamping dies 31 into engagement with the end portion of pipe section 16 to provide a forming die.

As explained later, the clamping cam blocks 22 are arranged to shift the clamping dies 31 into clamping engagement with the pipe section 16 before the pipe flaring die assembly 23 advances to its final heading position, such that the pipe is securely clamped before its end portion is acted upon.

The angular disposition of the cam surfaces 50 and 51 (pipe clamping fixture 21) are such that there is provided a wedging action which forces the clamping dies under a lateral force which is greater than the vertical pressure which is generated by the ram 7 of the press.

As the cam blocks 22 descend, their outer bearing surfaces 52—52 (FIGURES 5 and 7) slidably engage respective back-up blocks 53 which are secured by screws 54 to the lower mounting plate 13. The back-up blocks 53 absorb the lateral thrust normally tending to force the cam blocks 22 outwardly during the die closing operation. In the final position of the cam blocks 22 (FIGURE 5), the clamping slide blocks 28 and clamping dies 31 are positively locked in closed position by engagement of the flat faces of the cam blocks 22 with the flat faces of the slide blocks 28.

The open position of the clamping slide blocks 28—28 (FIGURE 7) is limited by stop members 55 secured by screws to the lower mounting plate 13. As the cam blocks 22 shift the clamping slide blocks 28 toward one another, the springs 46 are compressed (FIGURE 5). When the cam blocks are elevated (FIGURE 7) the compression springs 46 force the slide blocks 28 outwardly to the open position into engagement with the stop members 55—55.

*Pipe heading die assembly*

Referring to FIGURES 4, 6, 8 and 15, the pipe heading die assembly 23, previously indicated in FIGURE 1, comprises a slide block 56 mounted for horizontal reciprocation relative to the mounting plate 13 and including a demountable flaring punch indicated generally at 57. The slide block 56 includes a slide plate 58 secured by screws 60 to the block. The slide plate 58 includes outer edge portions 61—61 (FIGURE 8) which project outwardly beyond the sides of slide block 56.

A a pair of hold-down rails 62—62 slidably overhang the edge portions 61 so as to confine the slide plate 58 and the slide block 56 with respect to the mounting plate 13. The hold-down rails 62 are secured in place by screws 63. Each slide plate 58 is slidably supported with respect to mounting plate 13 by a pair of hardened wear strips 64—64 secured by screws to the mounting plate 13 (FIGURE 8).

The pipe heading die assembly 23 normally is urged to its retracted position by a pair of compression springs 65—65 (FIGURES 3 and 6) having inner ends seated within bores 66 formed in a back-up block 67 secured by screws 68 threaded into the mounting plate 13. Each compression spring 65 is confined upon a stud 70 having an end 71 threaded into the slide plate 58. The outer end of each compression spring 65 is seated against a washer 72 which engages a pair of adjustment nuts 73—73 threaded upon the outer end of stud 70.

The slide block 56 includes an inclined outer surface 74 upon which is mounted a hardened wear plate 75, the wear plate being secured in place by screws 76 (FIGURES 3 and 6). The cam block 24, which actuates the slide block 56, is secured by screws 77 (FIGURE 6) to the upper mounting plate 15. The cam block 24 includes an inclined cam surface 78 having an angle corresponding to the surface of the wear plate 75.

During downward motion of the ram from the position of FIGURE 6 to the position of FIGURE 4, the inclined surface 78 of cam block 24 engages the inclined surface of wear plate 75. This motion generates a wedging action, forcing the slide block 56 and its flaring punch 57 toward and into pressure engagement with the end portion of the pipe section 16 which, at this time, is clampingly engaged between clamping dies 31—31, as shown in FIGURE 5. By virtue of the wedging action, the lateral thrust acting upon the slide block 56 is substantially greater than the vertical thrust provided by the ram 7. It will be noted in FIGURES 4 and 12, that the outer bearing surface 80 of cam block 24 slidably engages the surface of the back-up block 67 during downward motion of the cam block and before the flaring punch 57 engages the end portion of the pipe section 16.

Described in detail, the flaring punch 57 comprises a mounting stud 81 (FIGURES 4, 6 and 15) interfitting a bore 82 formed in the inner face of slide block 56. A screw 83 passes through slide block 56 with its end threaded as at 84 into the stud 81. The head of screw 83 is seated in a counter bore 85 formed in block 56.

It will be understood at this point, that the flaring punch 57 is detachably secured in place and is interchanged to mate with the demountable clamping dies 31 to accommodate a selected pipe size. In order to interchange the flaring punch 57, the wear plate 75 is removed from the block 56 to permit tool engagement with the head of screw 83.

The flaring punch 57 includes a collar 86 seated against the face of slide block 56 and including a tapered boss 87. The outer end of boss 87 includes a swaging head 88 having shearing edge 89 which inertfits an annular die recess 90 (FIGURE 15) which is delineated by the closed clamping dies 31—31. The arrangement is such that the edge of the swaging head 88 and the edge of the recess 90 coact to provide a shearing action. The shearing edges 88 thus act to trim off excess metal from the end of the pipe section 16 and subsequently form the head, as explained later in detail.

Projecting outwardly from the swaging head 88 is a pipe expanding stud 91 (FIGURE 15) having an outer end which is rounded as at 92 to facilitate entry into the end portion of pipe section 16. It will be understood at this point, that the stud 91 is axially aligned with the inside diameter of the pipe which is clamped within the recesses 32 of the clamping dies 31. The dies 31 and stud 91 are precisely machined to interfit the external and internal diameters of the pipe section. In the event that the pipe section may be out of round, the stud 91 coacts with the clamping dies 31 to round the end portion of the pipe to a true diameter before formation of the head, as explained below.

*Operation*

The operation of the pipe heading mechanism is best shown in FIGURES 9–14, which show diagrammatically the action of the ram and slide blocks. The action of the flaring punch 57 as it acts upon the end portion of the pipe section during the heading operation is shown diagrammatically in FIGURES 15–17. Referring to FIGURES 9 and 10, the pipe heading mechanism is shown with the parts in the position assumed at the start of a cycle, with the ram 7 and upper mounting plate 15 in the elevated position corresponding to FIGURES 6 and 7. It will be noted in FIGURES 9 and 10, that the slide blocks 28—28 of clamping fixture 21 are in their fully retracted position, with the associated cam blocks 22—22 elevated. The pipe section 16, as noted earlier, is placed in the support fixture 17, with its forward end in operating position between the clamping dies 31 at the start of the cycle.

It will be understood at this point, that the abutment block 18 is adjustably secured by means of screws 93 (FIGURE 4) to the support fixture 17. The position of the block is adjusted for the particular length of the pipe section which is to be headed, such that the block 18 positions the pipe with its inner end projecting beyond the face of the clamping dies 31, as indicated at A in FIGURE 15. The projecting portion A subsequently is upset by operation of the flaring punch 57 to form the head.

When the cycle is initiated (FIGURES 11 and 12), the ram, with the upper mounting plate 15, descends, thus bringing the cam surfaces 50 of cam blocks 22 into sliding engagement with the coacting cam surfaces 51 of clamp slide blocks 28, thus forcing the clamping dies 31 toward one another and into clamping engagement with the end portion of pipe section 16. At the same time, the cam block 24 shifts downwardly (FIGURE 12) bringing its cam surface 78 into sliding engagement with the inclined surface of wear plate 75, so as to wedge the slide block 56 and flaring punch 57 toward the end of the pipe.

As the cam blocks 22 and cam block 24 begin to act upon the respective slide blocks (clamp slide blocks 28 and punch slide block 56) the outer bearing surfaces 52 and 80 slidably engage the bearing surfaces of the back-up blocks 53 and 67 which are rigidly secured to the lower mounting plate 15 (FIGURES 11 and 12). The lateral thrust which acts upon the cam blocks due to the wedging action against the slide blocks is thus transmitted to the back-up blocks to prevent any deflection of the parts under the pressure which is progressively developed.

The relationship of the cam block 22 (clamping fixture 21) and cam block 24 (pipe heading die assembly 23) is such that the clamp slide blocks 28 close before the flaring punch 57 reaches the end A of pipe section 16. Thus, in the position of FIGURES 11 and 12, the opposed faces of the clamping die blocks are approaching the final pipe clamping position in contact with one another as indicated by the arrow B (FIGURE 11) while the shearing edge 89 of swaging head 88 is spaced as at C (FIGURE 12) from the shearing edge provided by the annular recess 90.

The rate of motion of the clamping dies 31 is greater than the rate of motion of the flaring punch 57 by reason of the related slopes of the cam blocks 22 and 24. This relationship causes the die blocks to seat on their final clamping position (FIGURE 13) well in advance of the final position of the flaring die. Moreover, the slope of the cam block 24 provides a more powerful wedging action during the heading operation.

During the final downward motion of the ram (FIGURES 13 and 14), the die blocks are completely closed in clamping engagement with the pipe section and are locked positively by engagement of the flat faces 94 of the cam blocks 22 with the flat faces 95 of the slide blocks 28. It will be noted that this arrangement provides overtravel, as indicated at D (FIGURE 13), permitting the cam block 24 to progressively wedge the flaring die to its final position while the clamping dies remain stationary in pipe clamping position.

As the flaring punch reaches a position approximately as shown in FIGURE 14, the rounded end 92 of the flaring punch will have been forced partially into the open end of the pipe, thus expanding the pipe outwardly to round it in the event the pipe is not concentric. At this stage, the clamping dies 31 are positively locked (FIGURE 13) to confine the expanding pipe against the action of the flaring punch.

As the flaring punch progresses from the position shown in broken lines in FIGURE 15 to the position of FIGURE 16, the end of the pipe will have been engaged by the swaging head 88 which progressively upsets the end portion of the pipe, previously indicated at A in FIGURE 15. In other words, the end portion A is expanded as at 96 by the tapered portion 97 into the annular recess 90 formed by the closed clamping dies.

As the flaring punch 57 approaches its final limit (FIGURE 17), the excess metal is trimmed from the expanded portion 96 by the coacting shearing edges of swaging head 88 and recess 90. The sheared metal is indicated at 98 in FIGURE 17. At the final limit, swaging head 88 enters the recess 90, thus swaging or stamping the sheared expanded metal to the form of the head 100. At the same time, the tapered portion 97 forms a tapered seat 101 within the headed portion of the pipe section.

After formation of the head 100, the ram is retracted, thus causing the components of the die set to be shifted back to the position shown in FIGURES 9 and 10, permitting removal of the headed pipe for the next cycle of operation.

As noted earlier, the headed pipe section is reduced to its finished dimensions at completion of the operation shown in FIGURE 17 and is ready for use. Thus, the head 100 (FIGURE 18) provides a flange for a coupling nut 102 which includes a shoulder 103 engaging the head 100. The pipe section 104, which completes the coupling, includes an external tapered seat 105 which interfits the internal seat 101 of pipe section 16. The two seats are brought into sealing engagement when the coupling nut 102 is threaded upon and tightened with respect to the threaded portion 106 of pipe section 104.

Having described my invention I claim:

1. A pipe heading mechanism adapted to be mounted between the first and second relatively shiftable elements of a press, said heading mechanism adapted to swage an external head on the end portion of a pipe section, said heading mechanism comprising:
   a pipe clamping fixture shiftably mounted on the first element of the press and adapted to be shifted from an open pipe-receiving position to a pipe clamping position confining the end portion of the pipe section,
   a flaring punch shiftably mounted upon said first press element adjacent the pipe clamping fixture, said flaring punch adapted to be shifted along a line corresponding to the central axis of the pipe section which is confined in said clamping fixture,
   a clamp actuating member mounted on the second element of the press and engageable with said clamping fixture, thereby to shift the same from the open pipe-receiving position to the pipe-clamping position confining the end portion of the pipe section upon motion of said first and second elements of the press toward one another,
   a flaring punch actuating member mounted upon said second element of the press, said actuating element adapted to engage the flaring punch and to shift the same axially toward the clamping fixture and into pressure engagement with the end portion of the pipe section after the pipe section is confined in the clamping fixture,
   said flaring punch adapted to swage an external head on the end portion of the pipe section upon motion toward the pipe clamping fixture.

2. A pipe heading mechanism adapted to be mounted between the first and second relatively shiftable elements of a press, said heading mechanism adapted to swage an external head in the end portion of a pipe section and an internal seat therein, said heading mechanism comprising:
   a pipe clamping fixture shiftably mounted on the first element of the press and adapted to be shifted from an open pipe-receiving position to a pipe clamping position confining the end portion of a pipe section,
   a flaring punch shiftably mounted upon said first press element adjacent the pipe clamping fixture, said flaring punch adapted to be shifted along a line corresponding to the central axis of a pipe section which is confined in said clamping fixture,
   a clamp actuating member mounted on the second element of the press and engageable with said clamping fixture, thereby to shift the same from the open pipe-receiving position to the pipe-clamping position confining the end portion of a pipe section upon motion of said first and second elements of the press toward one another,
   a flaring punch actuating member mounted upon said second element of the press, said actuating element adapted to engage the flaring punch and shift the same axially toward the clamping fixture and into pressure engagement with the end portion of a pipe section after the pipe section is engaged by the clamping fixture,
   said flaring punch adapted to swage an external head on the end portion of the pipe section upon motion of the flaring punch toward the pipe clamping fixture,
   said flaring punch including an internal tapered portion adapted to form an internal tapered seat in the end portion of the pipe section concurrently with the heading operation.

3. A pipe heading mechanism adapted to be mounted between the first and second relatively shiftable elements of a press, said heading mechanism adapted to swage an external head on the end portion of a pipe section, said heading mechanism comprising:
   a pipe clamping fixture shiftably mounted on the first element of the press and adapted to be shifted from an open pipe-receiving position to a pipe clamping position confining the end portion of a pipe section, a flaring punch slidably mounted upon said first press element adjacent the pipe clamping fixture, said flaring punch adapted to be shifted along a line corresponding to the central axis of a pipe section which is confined in said clamping fixture, a clamp actuating member mounted on the second element of the press and engageable with said clamping fixture, thereby to shift the same from an open pipe-receiving position to the pipe clamping position engaging the end portion of a pipe section upon motion of said first and second elements of the press toward one another, a flaring punch actuating element mounted upon said second element of the press, said actuating element adapted to engage the flaring punch and shift the same axially toward the clamping fixture and into pressure engagement with the end portion of a pipe section after the pipe section is engaged by the clamping fixture, said flaring punch having a rounded end portion adapted to be forced axially into the end portion of the pipe section which is confined in said clamping fixture, said stud adapted to expand the end portion of the pipe section, within the die, thereby to finish the internal and external diameters of the end portion of the pipe section upon motion of the flaring punch toward the pipe clamping fixture, said flaring punch including a swaging head adapted to swage an external head on the end portion of the pipe section after the expanding action of said stud.

4. A pipe heading mechanism adapted to be mounted between the first and second relatively shiftable elements of a press, said heading mechanism adapted to swage an external head on the end portion of a pipe section, said heading mechanism comprising:

a pipe clamping fixture shiftably mounted on the first element of the press and adapted to be shifted from an open pipe-receiving position to a pipe clamping position confining the end portion of a pipe section, a flaring punch slidably mounted upon said first press element adjacent the pipe clamping fixture, said flaring punch adapted to be shifted along a line corresponding to the central axis of a pipe section which is confined in said clamping fixture, a clamp actuating member mounted on the second element of the press and engageable with said clamping fixture, thereby to shift the same from an open pipe-receiving position to the pipe clamping position engaging the end portion of a pipe section upon motion of said first and second elements of the press toward one another, a flaring punch actuating element mounted upon said second element of the press, said actuating element adapted to engage the flaring punch and shift the same axially toward the clamping fixture and into pressure engagement with the end portion of a pipe section after the pipe section is engaged by the clamping fixture, said flaring punch including a swaging head adapted to swage an external head on the end portion of the pipe section, said clamping fixture including an annular die recess formed in the face thereof and delineating the diameter of the head which is to be formed on the end portion of the pipe section, the external edge of said swaging head and the external edge of said annular die recess providing coacting cutting edges adapted to trim off excess metal from the end of the pipe section during motion of the flaring punch toward the pipe clamping fixture, the swaging head of the flaring punch interfitting said annular recess and thereby swaging the external head within the recess after said trimming operation.

5. A pipe heading mechanism adapted to be mounted between the first and second relatively shiftable elements of a press, said heading mechanism adapted to swage an external head on the end portion of a pipe section, said heading mechanism comprising:

a pipe clamping fixture shiftably mounted on the first element of the press and adapted to be shifted from an open pipe-receiving position to a pipe clamping position confining the end portion of a pipe section, a flaring punch slidably mounted upon said first press element adjacent the pipe clamping fixture, said flaring punch adapted to be shifted along a line corresponding to the central axis of a pipe section which is confined in said clamping fixture, a clamp actuating member mounted on the second element of the press and engageable with said clamping fixture, thereby to shift the same from an open pipe-receiving position to the pipe clamping position engaging the end portion of a pipe section upon motion of said first and second elements of the press toward one another, a flaring punch actuating element mounted upon said second element of the press, said actuating element adapted to engage the flaring punch and shift the same axially toward the clamping fixture and into pressure engagement with the end portion of a pipe section after the pipe section is engaged by the clamping fixture, said flaring punch having a rounded end portion adapted to be forced axially into the end portion of the pipe section which is confined in said clamping fixture, said stud adapted to expand the end portion of the pipe section within the die, thereby to finish the internal and external diameters of the end portions of the pipe section upon motion of the flaring punch toward the pipe clamping fixture, said flaring punch including a swaging head adapted to swage an external head on the end portion of the pipe section, said clamping fixture including an annular die recess formed in the face thereof and delineating the diameter of the head which is to be formed on the end portion of the pipe section, the external edge of said swaging head and the external edge of said annular die recess providing coacting cutting edges adapted to trim off excess metal from the end of the pipe section during motion of the flaring punch toward the pipe clamping fixture, the swaging head of the flaring punch interfitting said annular recess and thereby swaging the external head within the recess after said trimming operation.

6. A pipe heading mechanism adapted to be mounted between the first and second relatively shiftable elements of a press, said heading mechanism adapted to swage an external head upon the end portion of a pipe section, said heading mechanism comprising:

a pipe clamping fixture mounted upon the first shiftable element of the press, said pipe clamping fixture comprising a pair of clamping dies mounted for shifting motion relative to one another from an open pipe-receiving position to a closed pipe-clamping position in pressure engagement with the external periphery of the end portion of the pipe section, said clamping dies, in said closed position, adapted to provide a forming die surrounding and confining the end portion of the pipe section, a flaring punch slidably mounted upon the first element of the press adjacent the pipe clamping fixture and adapted to be shifted along a line corresponding to the central axis of the pipe clamping fixture and pipe section which is clamped therein, a clamping fixture actuating member mounted on the second element of the press and adapted to engage and shift said clamping dies from the said open pipe-receiving position to said pipe clamping position during relative motion of the first and second press elements toward one another, and a flaring punch actuating member mounted on the second element and adapted to shift the flaring punch axially toward the clamping fixture and into the end portion of the pipe section after the same is confined by the clamping dies, said flaring punch adapted to swage the external head on the end portion of the pipe section during said motion toward the pipe clamping fixture.

7. A pipe heading mechanism adapted to be mounted between the stationary platen and vertically movable ram of a press, said heading mechanism adapted to swage an external head on the end portion of a pipe section, said heading mechanism comprising:

a pipe clamping fixture adapted to receive a pipe section with the axis of the pipe section disposed in a horizontal plane, said pipe clamping fixture comprising a pair of opposed clamping dies mounted for shifting motion in a horizontal plane relative to one another upon the platen of the press from an open pipe-receiving position to a closed pipe-clamping position relative to the end portion of the pipe section, a flaring punch mounted upon the platen of the press adjacent the pipe clamping fixture and adapted to be shifted along a horizontal line corresponding to the central axis of the pipe clamping fixture and pipe section which is clamped therein, a pair of wedging members mounted on the ram of the press and adapted to engage and shift said clamping dies from the said open pipe-receiving position to said pipe-clamping position during downward motion of the ram toward said platen, and a wedging member mounted on the ram of the press and adapted to shift the flaring punch axially toward the clamping fixture and into pressure engagement against the end portion of the pipe section after the pipe section is confined by the clamping dies, said flaring punch adapted to swage the external head on the end portion of the pipe section during said motion toward the pipe clamping fixture.

8. A pipe heading mechanism as set forth in claim 7 in which there is provided a pair of slide blocks mounted for shiftable motion in a horizontal plane relative to one another upon the platen of the press from an open pipe-receiving position to a closed pipe-clamping position, said pipe clamping dies being mounted on said slide blocks for movement therewith, said pair of wedging members which are mounted on the ram of the press having inclined wedging surfaces engageable with said slide blocks and adapted to slidably engage and shift said slide blocks and clamping dies into pressure engagement with the end portion of the pipe section which is placed between said clamping dies.

9. A pipe heading mechanism as set forth in claim 8 in which there is provided a slide block mounted for shiftable motion upon the platen of the press in a horizontal plane relative to the axis of a pipe section confined between said clamping dies, said flaring punch being mounted upon said slide block, and in which the wedging member on the ram of the press includes an inclined surface engageable with the slide block of the flaring punch and adapted to shift the flaring punch into pressure engagement with the end portion of the pipe section which is confined between said clamping dies, thereby to form the external head on the end portion of the pipe section.

10. A pipe heading mechanism as set forth in claim 9 in which the wedging members which actuate the slide blocks of the clamping dies include vertical bearing surfaces parallel with the line of motion of the vertically movable ram of the press, said vertical bearing surfaces extending upwardly from the inclined surfaces of the wedging members, said wedging members adapted to shift the clamping dies to their closed position and to lock the dies in said closed position by engagement of said vertical bearing surfaces while the inclined surface of the wedging member, which engages the slide block of the flaring die, is acting upon said slide block, thereby to advance the flaring die toward the end of the pipe to swage said external head after the clamping dies are shifted to said closed and locked position.

11. A pipe heading mechanism as set forth in claim 9 in which the stationary platen of the press includes respective back-up blocks secured thereto, said back-up blocks each including vertical bearing surfaces disposed in a plane parallel with the vertical line of motion of the ram of the press, the wedging members which actuate the clamping dies and flaring punch each having bearing surfaces disposed in the plane of the bearing surfaces of the back-up blocks and slidably engaged therewith, whereby the lateral force developed by the wedging members during the downward motion of the ram reacts against said back-up blocks.

12. A pipe heading mechanism as set forth in claim 9 in which there is provided an abutment element engageable with the outer end of the pipe section which is confined between the clamping dies, said abutment element adapted to position the pipe section lengthwise with respect to the flaring punch.

13. A pipe heading mechanism as set forth in claim 7 in which the opposed clamping dies of the clamping fixture each include a first pair of opposed semi-circular recesses adapted to forcibly embrace the external periphery of the end of the pipe section to be headed, and in which the surfaces of the clamping dies which are presented to the flaring punch include a second pair of semi-circular recesses having a diameter greater than the diameter of the first pair of semi-circular recesses, the second pair of recesses delineating the diameter and thickness of the head which is formed upon the end portion of the pipe section during the heading operation.

14. A pipe heading mechanism as set forth in claim 13 in which the flaring punch includes a swaging head having an outside diameter interfitting the second pair of recesses of the clamping dies when the dies are in closed position, thereby to engage the end portion of the pipe section and swage the same to the diameter delineated by said second pair of recesses.

15. A pipe heading mechanism as set forth in claim 13 in which the forward edge of the swaging head and the forward edge of said second pair of recesses coact with one another to provide a shearing action during the advancement of the flaring punch, said shearing edges adapted to sever excess metal from the end of the pipe section during the swaging stroke of the flaring punch.

16. A pipe heading mechanism as set forth in claim 14 in which the swaging head of the flaring punch includes a pipe expansion stud projecting therefrom adapted to interfit the internal diameter of the pipe, and in which there is provided a tapered portion at the juncture of the swaging head and expansion stud adapted to form an internal seat within the headed end portion of the pipe section.

References Cited by the Examiner
UNITED STATES PATENTS

| | | | |
|---|---|---|---|
| 1,668,996 | 5/1928 | Anderson | 72—294 |
| 2,683,999 | 7/1954 | Hammond | 72—478 |
| 3,059,509 | 10/1962 | Sofranko et al. | 72—314 |
| 3,143,008 | 8/1964 | Payne | 72—314 |
| 3,154,972 | 11/1964 | Neumeier et al. | 72—294 |

WILLIAM W. DYER, JR., *Primary Examiner.*